United States Patent [19]

Miki

[11] Patent Number: 4,564,265

[45] Date of Patent: Jan. 14, 1986

[54] OPTICAL UNIT

[75] Inventor: Yukio Miki, Sakai, Japan

[73] Assignee: Minolta Camera Kabuskiki Kaisha, Osaka, Japan

[21] Appl. No.: 527,357

[22] Filed: Aug. 29, 1983

[30] Foreign Application Priority Data

Aug. 31, 1982 [JP] Japan .................................. 57-151429

[51] Int. Cl.[4] ............................ G42B 7/14; G43B 3/44
[52] U.S. Cl. ..................................... 350/255; 350/252; 354/286
[58] Field of Search ................ 350/255, 257; 354/286, 354/195

[56] References Cited

U.S. PATENT DOCUMENTS 4,449,807  5/1984  Miki et al. ............................ 354/286

Primary Examiner—John K. Corbin
Assistant Examiner—William Propp
Attorney, Agent, or Firm—Watson, Cole, Grindle & Watson

[57] ABSTRACT

The disclosure is directed to an improved optical unit provided with a driving shaft which is arranged to be displaced in an axial direction for connection with a driven shaft of a mating instrument, following attachment or detachment with respect to the mating instrument. In the optical unit, safety of the mounting surface of the mating instrument and safety of the connecting end portion of the driving shaft have been ensured by providing a difference between the amount of displacement of a position restricting member advancing into a mounting position restricting recess provided in a mounting surface of the mating instrument, and the amount of displacement of the driving shaft to be connected to an end to be clutched of a driven shaft which is borne or journalled in a hole formed in the mounting portion of the mating instrument.

6 Claims, 13 Drawing Figures

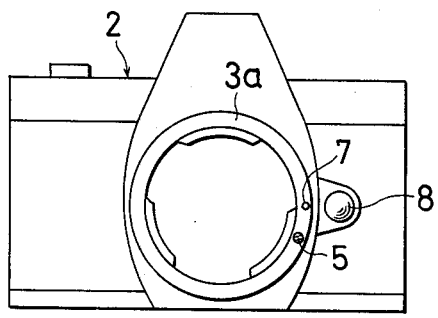
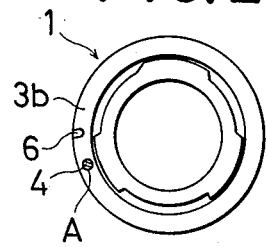
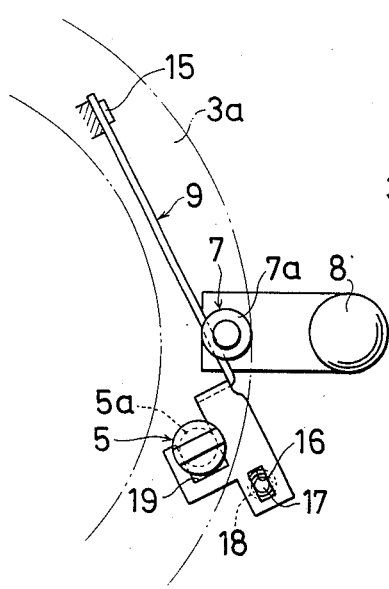
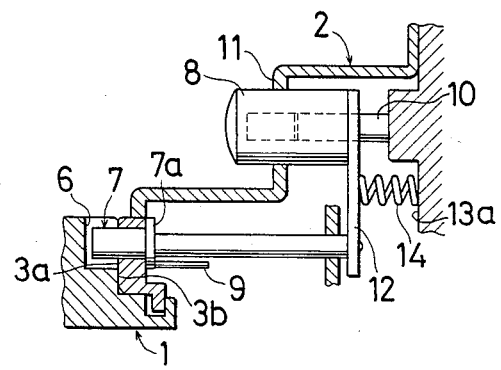
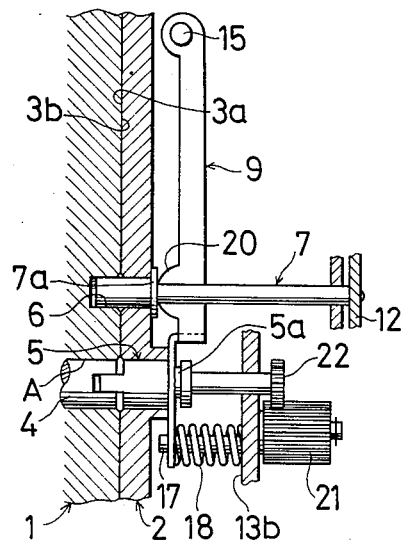

OPTICAL UNIT

BACKGROUND OF THE INVENTION

1. Technical Field

The present invention generally relates to an optical instrument and more particularly, to an optical unit provided with a driving transmission shaft which may be disengaged from a corresponding driving transmission shaft of a mating instrument, in association with the detachment of the mating instrument from the optical unit for example, as in an automatic focusing system camera which is so arranged that a driving force for focusing control can be transmitted from a camera main body to an interchangeable or exchangeable lens (referred to as an exchangeable lens hereinafter).

2. Prior Arts

An automatic focusing camera is known, which is arranged to transmit a focusing control driving force produced from the interior of a camera main body to a focusing system provided in an exchangeable lens barrel with a lens system driving shaft arranged to be projected from or retreated into a mounting surface of the camera main body, and a driven shaft of the exchangeable lens barrel. In such automatic focusing camera, it is required, for the detachment of the exchangeable lens barrel, that the driving shaft also be released from the driven shaft when a position restricting member adapted to be projected from or retreated into the mounting surface of the camera main body is released from a position restricting recess in the exchangeable lens barrel by operating a lock releasing member.

However, in the known cameras of the above described type, since a sufficient consideration has not been given to the relation between the retreating movement of the position restricting member into the camera main body and the retreating movement of the driving shaft it is possible that the following problems could arise during detachment of the exchangeable lens barrel.

(a) For example, where the optical system driving shaft still projects slightly from the mounting surface of the camera main body when the position restricting member has been retreated to a position sufficient for the detachment, if the exchangeable lens barrel is unduly rotated or revolved when detached, not only the mounting surface of the lens barrel is damaged, but it may be impossible to detach the lens barrel, with the driving shaft remaining engaged with an end of the driven shaft for the exchangeable lens barrel in these instances where the drive shaft projects outwardly to a large degree. (b) In this situation, the rotational force for the detachment is applied to the end of the driving shaft and a clutch portion at the forward end of the driven shaft so as to cause possible damage at such portions, thus resulting in an inconvenience in the engagement of the clutch thereafter.

(c) Also, where the amount or length of retreatment of the driving shaft from the mounting surface of the camera main body is smaller than the amount or length of retreatment of the position restricting member, the following problems occur. When the rotating operation is effected for detachment with both the position restricting member and the driving shaft retreated from the mounting surface, if the operation by the lock releasing member is removed in the course of rotation, the optical system driving shaft is released from the retreatment so as to contact the mounting surface of the exchangeable lens barrel under high pressure. Therefore, if the rotation for the detachment is further continued, the mounting surface of the exchangeable lens barrel is undesirably damaged by the end of the driving shaft.

The optical system driving shaft in the camera main body is arranged to be advanced or retreated as described above, but similarly take place when the lock releasing member and the position restricting member are provided in the exchangeable lens barrel, with the driven shaft being adapted to be advanced or retreated with respect to the camera main body.

In FIGS. 5 through 10 of U.S. Pat. No. 449,807, commonly owned herewith there is provided a mount positioning recess 64, and a driven shaft 60 is associated with the optical systems 52 and 53 in the mounting portion of an interchangeable lens 2. The forward end portion of the driven shaft 60 projects from the bottom face of the recess 64 to an extent that it does not extend outwardly from the mounting surface. Meanwhile, at the mounting portion of the photographic camera main body 1, the mount positioning member 9 is supported so as to be movable between the projecting position where it projects from the mounting surface and is fitted into the recess 64 and the retreating position where it is retreated into the mounting surface, and is urged towards the projecting position by a spring 15. On the other hand, the driving shaft 13 is disposed within the positioning member 9, and is arranged to be normally movable together with the member 9 as one unit between the engaging position where it is engaged with the driven shaft 60 and the disengaging position where it is spaced from the driven shaft 60. In the camera described above, since the flange 33 of the shaft 13 contacts the stepped portion 38, there is no possibility that the forward end of the shaft 13 projects beyond the forward end of the member 9. Accordingly, when the end of the member 9 is retreated from the mounting surface, the end of the shaft 13 has been retreated from the mounting surface without fail.

However, in this known photographic camera, it is necessary that the member 9 project to an extent greater than the length of projection required for the engagement at the shafts 13 and 60. Therefore, the amount of operation of the mount release button 7 as a manual member necessary for causing the member 9 to be retreated from the mounting surface, is undesirably increased. Meanwhile, at the lens barrel side, a deeper recess must be formed compared to a depth necessary for the positioning.

SUMMARY OF THE INVENTION

An essential object of the present invention is to provide an optical unit which is equipped with a driving transmission shaft capable of being smoothly attached to or detached from a mating instrument without any possibility of damaging the driving transmission shaft or the surface of the mating instrument during the attachment and detachment thereof with respect to the mating instrument, with substantial elimination of problems inherent in the prior art arrangements described earlier.

Another object of the present invention is to provide an optical unit of the above described type in which the amount of displacement for a position restricting member adapter to advance into a mounting position restricting recess formed in a mounting surface of the matching instrument is arranged to be different from the amount of displacement for a driving shaft connected to the end to be clutched of a driven shaft borne or journalled in a hole provided in a mounting portion of the mating instrument such an arrangement ensures safety of the mounting surface of the mating instrument and also safety of the connecting end portion of the driving shaft.

In the optical unit according to the present invention, since the amount of movement of the shaft is arranged to be greater than the amount of movement of the position restricting member, it is possible to set the amount of projection of the restricting member only to the amount required for the positioning. Therefore, the amount of operation of the manual operating member is not increased, and the position restricting recess may also be made shallow in depth. Moreover, the shaft positively retreats from the mounting surface when the restricting member has been retreated from the mounting surface.

These and other objects and features of the present invention will be made more apparent from the following explanation in the detailed description of the invention.

BRIEF DESCRIPTION OF THE DRAWINGS

FIG. 1 is a schematic front elevational view of a main body of a photographic camera to which a first embodiment according to the present invention may be applied, FIG. 2 is a front elevational view of a mounting portion of an exchangeable lens barrel to be attached to or detached from the camera main body, FIG. 3 is a fregmentary front elevational view showing, on an enlarged scale, a portion of the camera main body, FIG. 4 is a fragmentary cross sectional view of a portion of the camera main body, FIG. 5 is a fragmentary side sectional view showing a state in which the exchangeable lens is attached to the camera main body.

DETAILED DESCRIPTION OF THE PREFERRED EMBODIMENTS

Figure 6:
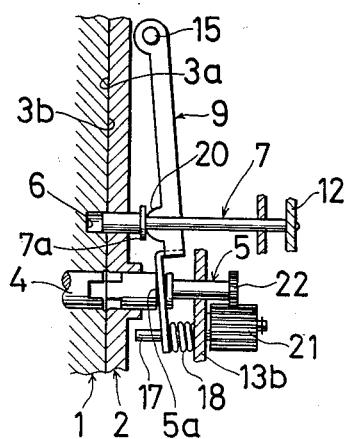
FIGS. 6 and 7 are fragmentary side sectional views respectively showing lock releasing functions.

Based on FIG. 1 through FIG. 7, a first embodiment according to the present invention will now be described.

The optical unit of this embodiment relates to a photographic camera main body 2 having an exchangeable lens barrel 1 as a mating instrument and arranged to be attached to or detached from each other through mutual rotation with respect to said exchangeable lens barrel 1. The main body 2 is provided with a first shaft 5 acting as an optical system driving shaft which reciprocates in a direction of an optical axis of a taking lens for projection from or retreatment into a predetermined position of a mounting surface 3a of camera main body 2 so as to be engaged with or disengaged from a second shaft 4 as a driven shaft provided in a hole A formed in a surface 3b of the exchangeable lens barrel 1. The main body 2 is also provided with a position restricting member 7 in the form of a pin which reciprocates in the direction of the optical axis in the similar manner as the first shaft 5 for projection from or retreatment into a predetermined position of the mounting surface 3a of the camera main body 2 so as to be engaged with or disengaged from a position restricting recess 6 formed in the surface 3b of the exchangeable lens barrel. There is further provided a manual unlock member 8 for releasing the engagement of the first shaft 5 and the position restricting member 7 with the second shaft 4 and the position restricting recess 6 by an external operation. Further provided is a releasing member 9 for associating the retreating function of the position restricting member 7 with the retreating function of the first shaft 5 as described above, following the engagement releasing operation by the manual unlock member 8. By the above releasing member 9, the order in terms of time for the retreatment of the position restricting member 7 and the first shaft 5 is set in such a manner that, when the forward end of the position restricting member 7 has retreated to a position where it is disengaged from the position restricting recess 6, the forward end of the first shaft 5 retreats into the camera main body 2 beyond a position where it is disengaged from the hole A.

The manual unlock member 8 is fitted over a guide shaft 10 disposed in a predetermined position within the camera main body close to the mounting surface 3a so as to be reciprocable towards the front portion through a front cover 11 of the camera main body 2. A coil spring 14 is disposed between a connecting plate 12 extending from the rear end portion of the manual unlock member 8 towards the back of the mounting surface 3a and a stationary member 13a of the camera main body at the back side of the above connecting plate 12 so as to urge the unlock member 8 towards the front side of the camera main body 2.

A position restricting member 7 is provided to project at the end portion of the connecting plate 12 extending along the back side of the mounting surface 3a of the camera main body so that the position restricting member 7 is advanced or retreated following the reciprocating functions of the manual unlock member 8 for effecting locking and unlocking with respect to the position restricting recess 6 of the mounting surface 3b for the exchangeable lens barrel 1 as the mating instrument.

As shown in FIGS. 3 and 5, the releasing member 9 is pivotally connected, at its one end, to the camera main body 2 through a pivot pin 15, while a guide opening 16 formed at the other end of the releasing member 9 is fitted over a guide pin 17 of the stationary member 13b of the camera main body. By the action of a coil spring 18 mounted on guide pin 17, the releasing member 9 is urged towards the front side of the camera for pivotal movement in the back and forth direction of the camera main body 2. At the other end of the releasing member 9, there is further formed a cutout guide portion 19 which is fitted into a peripheral groove 5a formed in the first shaft 5. In a position between the cutout guide portion 19 and the pivot pin 15, a semi-circular projection 20 is formed on the member 9 so as to project towards the front side of the camera main body for engagement of the semi-circular projection 20 with the back face of an engaging flange portion 7a formed on the peripheral barrel portion of the position restricting member 7. Thus, following the retreating function of the position restricting member 7, the releasing member 9 rotates towards the back face side of the camera main body against the urging force by the coil spring 18, and by the above rotation, the first shaft 5 engaged with the cutout guide portion 19 is caused to retract into the camera main body.

The projecting length of the position restricting member 7 extending outwardly from the mount face 3a and that of the first shaft 5 owing to the depression by the releasing member 9 in the direction towards the front face of the camera main body, are so set that the projecting length of the position restricting member 7 engaging at the semi-circular projection 20 close to the pivot shaft 15 as compared with the first shaft 5 engaging at the cutout guide portion 19 of the releasing member 9, is slightly greater than the projecting length of the first shaft 5. Thus, during rotation of the releasing member 9 towards the inner side of the camera main body, the retraction of the first shaft 5 from the mounting surface 3a is effected prior to the retreatment of the position restricting pin 7 without fail.

The first shaft 5 is pivotally connected at its other end to the stationary member 13b of the camera main body. At the rear end of the first shaft 5, there is fixed a driven gear 22 which is in mesh with a driving gear 21 borne or journalled at the back side of the stationary member 13b of the camera main body, so that rotation of a motor (not shown) driven and controlled by a focus control unit provided in the camera main body 2 is transmitted to the driving gear 21 through a suitable transmission system. Subsequently, the rotation of the above driving gear 21 is arranged to be transmitted to the first shaft 5 through the driven gear 22.

The function of the optical unit having the exchangeable lens barrel 1 as a mating instrument, during detachment of the mating instrument will now be described based on FIGS. 5 through 7.

In the state as shown in FIG. 5 in which the exchangeable lens barrel 1 is attached to the camera main body 2, the releasing member 9 is urged towards the front side of the camera main body by the urging force of the coil spring 18. Therefore, the position restricting member 7 and the first shaft 5 are depressed by the releasing member 9 so as to be both projecting from the mounting surface 3a for respective engagement with the corresponding positioning restricting recess 6 in the surface 3b to be mounted and the second shaft 4 in the hole A.

In the attached state of the exchangeable lens 1 as described above, when unlocking is attempted by depressing the manual unlock member 8 projecting towards the front side of the camera main body against the coil spring 14, the position restricting member 7 integral with the unlock member 8 through the connecting plate 12 follows the movement of the unlock member 8 so as to retract into the camera main body. With such retraction the releasing member 9 whose semi-circular projection 20 is contacting the back face side of the engaging flange portion 7a is depressed into the camera main body against the urging force of the coil spring 18. Accordingly, the first shaft 5 engaging the cutout guide portion 19 of the releasing member 9 similarly retracts into the camera main body.

As described earlier, the projecting length of the position restricting member 7 from the mounting surface 3a is set to be greater than the projecting length of the first shaft 5. In addition to the above, with respect to the amounts of retraction of the position restricting member 7 and the first shaft 5 following the unlocking operation, the amount of retraction of the first shaft 5 which engages the cutout guide portion 19 of the position restricting member 9 located farther from the pivot shaft thereof than the position restricting member 7, is arranged to be large as compared with the amount of retraction of member 7 which engages the releasing member 9 at its semi-circular projection 20 closer to the pivotal end portion of releasing member 9. Accordingly, as shown in FIG. 6, upon retraction of the position restricting member 7 up to a position where it projects slightly from the mounting surface 3a, the first shaft 5 is completely released from the engagement with the second shaft 4 of the exchangeable lens barrel 1 so as to be retracted up to a position where the forward end thereof is disengaged from the hole A of the exchangeable lens barrel 1 (i.e. the position flush with the mounting surface 3a of the camera main body). Subsequently, when the position restricting member 7 has retracted to the position where it is flush with the mounting surface 3a of the camera main body as shown in FIG. 7 as the releasing member 9 is further retracted, eated, the first shaft 5 retires to a position where it has completely retracted into the camera main body 2 from the mounting surface 3a.

Figure 7:
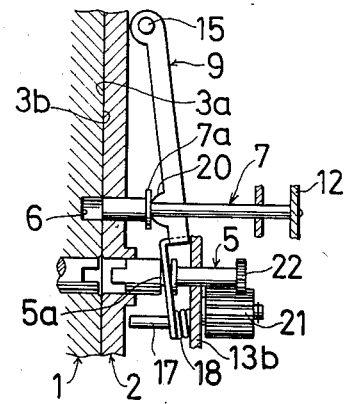

Accordingly, in the state where it is possible to detach the exchangeable lens barrel 1 from the camera main body 2 through rotation thereof, with the position restricting member 7 being disengaged from the position restricting recess 6 so as to be retracted to the position where it is flush with the mounting surface 3a of the camera main body and/or where it is retracted into the camera main body 2 as shown in FIG. 7, the first shaft 5 is positively disengaged from the hole A for retraction within the camera main body 2. Therefore, such inconveniences that the detachment through rotation is effected during the detaching operation in the state where the releasing of engagement from the second shaft 2 is insufficient or where the first shaft 5 is projecting from the mounting surface 3a of the camera main body 2 to a certain extent, can be positively prevented. More specifically, by the above arrangement, there may be avoided such accidents that detaching becomes impossible due to the first shaft 5 being caught by the mounting portion of the exchangeable lens barrel 1, or that the forward end portions of the first shaft 5 and the second shaft 4 are damaged during detachment of the exchangeable lens barrel 1 from the main body 2 through rotation, or that the mounting surface 3b of the exchangeable lens barrel side is undesirably injured through scraping by such projecting ends.

Figure 8:
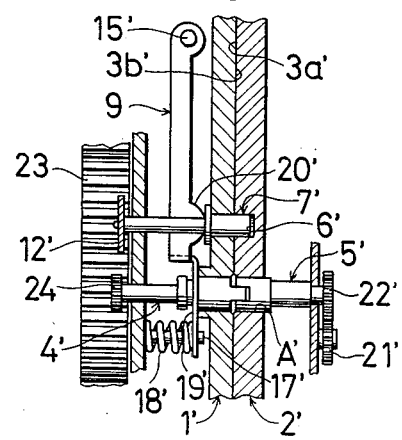
FIG. 8 is a fragmentary cross section at an essential portion showing a state in which an exchangeable lens barrel is attached to a camera body according to a second embodiment of the present invention.

In the second embodiment of the present invention shown in FIG. 8, the construction of the first embodiment described above is instead applied to the exchangeble lens barrel 1', and the position restricting member 7' is adapted to project from or retract into the mounting surface 3'b of the exchangeable lens barrel 1' in the direction of the optical axis so as to be selectively engaged with or disengaged from the position restricting recess 6' in the mounting surface 3'a of the camera main body 2'. And, the second shaft 4' which is adapted to be engaged with or disengaged from the first shaft 5' in the driven shaft hole A' of the mounting surface 3'a for the camera main body is arranged to project from or retract into the mounting surface 3'b of the exchangeable lens 1' in the direction of the optical axis. With respect to the construction of the releasing member 9' for associating the position restricting member 7' with the second shaft 4', the arrangement is generally the same as that for the releasing member 9 described in the first embodiment.

At the forward end portion of the second shaft 4', there is fixed a small gear 24 which is in mesh with a large gear 23 formed in the peripheral surface of the lens barrel, so that the rotation transmitted from the first shaft 5' to the second shaft 4' through the driving gear 21' and driven gear 22' at the camera main body is transmitted to the large gear 23 through the small gear 24, whereby a lens displacing unit (not shown) is actuated, following the rotation of the large gear 23.

Although the manual unlock member is not specifically shown here, the construction thereof is generally the same as that of the first embodiment except that such member is provided in the exchangeable lens barrel 1' in this embodiment, different from the arrangement in the first embodiment. Thus, it is so arranged that, by the depressing operation of the manual unlock member towards the front side, the position restricting member 7' connected as one unit with the manual unlock member through the connecting plate 12' is retired into the exchangeable lens barrel 1' from the mounting surface 3'b.

In a similar manner as in the first embodiment, the projecting length from the mounting surface 3'b of the position restricting member 7' which engages at the semi-circular projection 20' close to the pivoted end of the releasing member 9' is set to be slightly greater than the projecting length of the second shaft 4' which engages at the cutout guide portion 19' located farther from the pivoted end of the releasing member 9' as compared with the position restricting member 7'.

As seen from the foregoing description, since the arrangement of the first embodiment is applied as it to the side of the exchangeable lens barrel 1' in this second embodiment, the function thereof in the case of the unlocking is the same as that in the first embodiment, and therefore, detailed description thereof is omitted for brevity.

Figure 9:
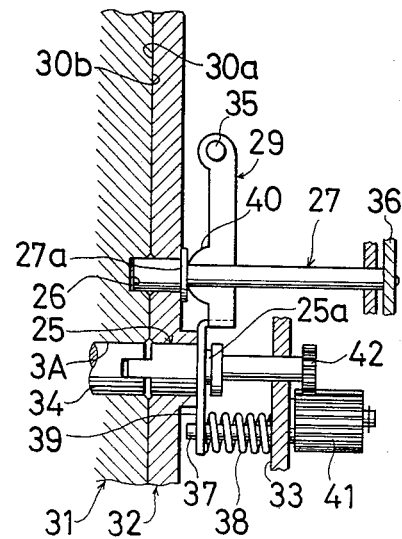
FIGS. 9 and 10 are fragmentary side sectional views at an essential portion respectively showing the locked state and unlocked state according to a third embodiment of the present invention.
Figure 10:
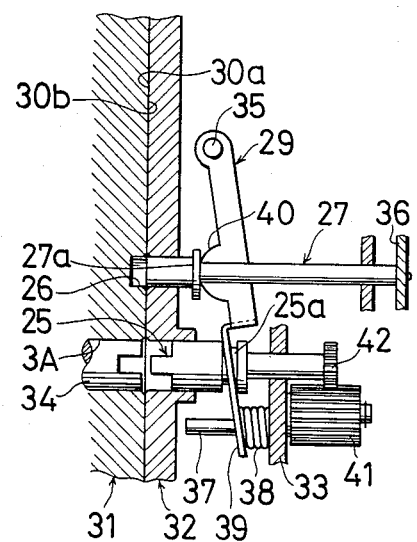

In a third embodiment according to the present invention as shown in FIGS. 9 and 10, the moving ratio of the position restricting member 27 and the first shaft 25 is increased so that the ratio of a length of the arm from the pivot pin 35 which serves as a fulcrum of the releasing member 29 up to the position restricting member 27, with respect to a length of the arm from pivot pin 35 to the first shaft 25, becomes more extreme than in the first embodiment and, the amount of projection of the position restricting member 27 in the attached state as shown in FIG. 9 is suppressed to be smaller than the amount of projection of the first shaft 25. With respect to the other construction, the arrangement is generally the same as in the first embodiment.

By setting the moving ratio of the member 27 to the first shaft 25 as described above, the retracting stroke of the position restricting member 27 from the position restricting recess 26 becomes smaller than the retracting stroke of the second shaft 34 from the shaft hole 3A. Accordingly, the depth of position restricting recess 26 may be more shallow, with a consequent reduction of the region occupied by the position restricting recess 26 in the exchangeable lens barrel 31, thus it being advantageous from a design standpoint of the mounting portion. Moreover, even though the position restricting recess 26 is formed shallow, it is possible to set the retreating timing in such a manner that, owing to the increase of the moving ratio as described earlier, in the retreating function of the position restricting member 27 and the first shaft 25 following the unlocking operation, the first shaft 25 can positively retreat from the mounting surface 30a into the inner side of the camera main body 32, when the position restricting member 27 has retracted to the position (which is flush with the mounting surface 30b) where it is disengaged from the position restricting recess 26.

Furthermore, since the functioning of the manual unlock member (equivalent to 8 in the first embodiment) which is not particularly shown is transmitted to the releasing member 29 through the connecting plate 36 and the flange portion 27a of the position restricting member 27, the amount of operation of the manual unlock member may be reduced by the shortening of the retreating stroke for the position restricting member 27.

In FIGS. 9 and 10, there are also provided the peripheral groove 25a a of the first shaft 25, stationary portion 33 within the camera body, guide pin 37 of the releasing member, coil spring 38, cutout guide 39 related to said peripheral groove 25a, and semi-circular projection 40 of the releasing member, and the configurations and functions of these parts are the same as those in the first embodiment.

It should be noted that, although the moving ratio of the position restricting member 27 to the first shaft 25 is arranged to be enlarged by shortening the releasing member 29 without altering the distance between the position restricting member 27 and the first shaft 25, the arrangement may be so modified, apart from the above, in such a manner that, with the length of the releasing member 29 maintained as it is, only the position of the position restricting member 27 is set close to the first shaft 25.

Figure 11:
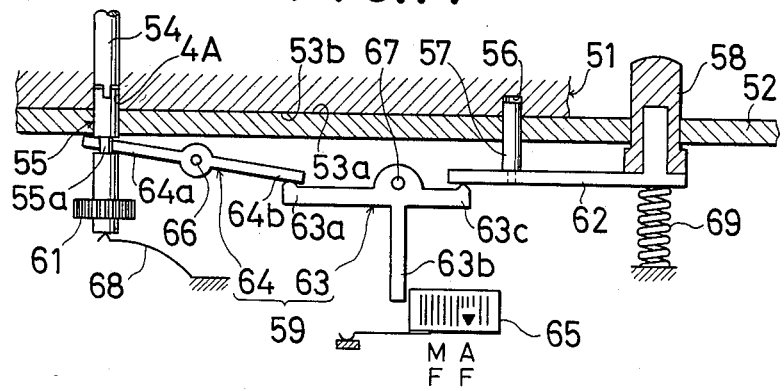
FIGS. 11 and 12 are fragmentary side sectional views at an essential portion respectively showing the locked state and unlocked state according to a fourth embodiment of the present invention.
Figure 12:
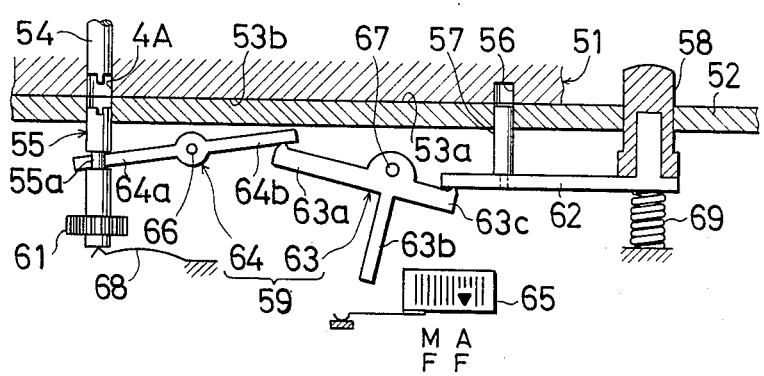
Figure 13:
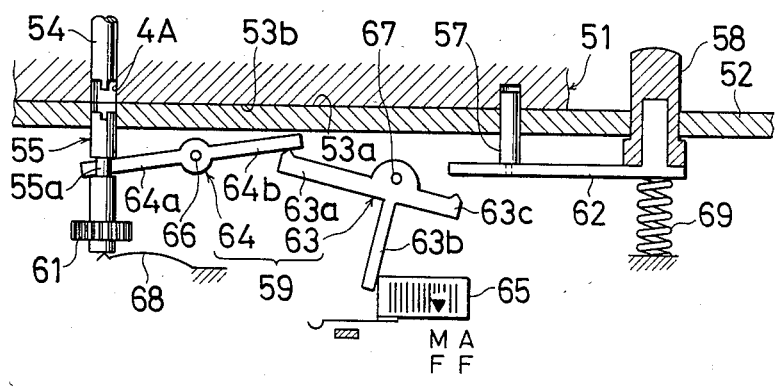
FIG. 13 is a fragmentary side sectional view at an essential portion showing a manual focus mode set state for the fourth embodiment of the present invention.

Referring further to FIGS. 11 through 13, a fourth embodiment according to the present invention will now be described.

The optical unit according to this embodiment includes the camera main body 52 provided with a changeover function between the auto-focus mode and manual focus mode. The releasing members 59 for transmitting the functioning of the unlock member 58 to the first shaft 55 is constituted by two members, i.e. levers 63 and 64, while the releasing member 59 is associated with a focus mode change-over button 65 so that, in a state where the focus mode change-over button 65 has been changed over to the side of the manual focus mode, the position restricting member 57 and the first shaft 55 are retracted into the camera main body 52 respectively from the position restricting recess 56 of the mounting surface 53b at the side of the exchangeable lens barrel 51 and the recess 4A for the second shaft. There is also provided a driving gear 61 for the first shaft.

A lever 64 pivotally supported by the camera main body 52 at a pivotal axis 66, has its one end 64a engaged with a peripheral groove 55a of the first shaft 55. And, another lever 63 pivotally supported by the camera main body 52 at a pivotal axis 67 is provided with three branched pieces 63a, 63b and 63c together forming a T-shape. One branched piece 63a is adapted to contact the other end 64b of the lever 64, another branched piece 63c contracts the connecting plate 62 which extends from the unlock member 58, and the remaining one branched piece 63b is arranged to confront the region for advancing and retreating of the focus mode changeover button 65.

In FIG. 11, there is provided a plate spring 68 which is fixed to the camera main body 52 so as to urge the first shaft 55 towards the side where it projects out of the camera main body 52. Then, the lever 64 is biased in the clockwise direction, while the lever 63 is urged in the counterclockwise direction.

The branched piece 63a of the lever 63 is arranged to be sufficiently longer than the branched piece 63c so that the amount of operation of the unlock member 58, i.e. the amount of retraction of the position restricting member 57 is transmitted to the lever 64 to a greater degree through the lever 63, whereby the moving ratio between the position restricting member 57 and the first shaft 55 is arranged to be increased.

In this embodiment also, the projecting amount of the position restricting member 57 is adapted to be smaller than the projecting amount of the first shaft 55 by the amount through which the retreating amount of the first shaft 55 is enlarged as compared with the position restricting member 57.

In the unlocking operation shown in FIG. 12 in which the unlock member 58 is pushed in against the coil spring 69, when the position restricting member 57 is retracted up to the position where it becomes flush with the camera main body side mounting surface 53a through the enlarged moving ratio as described earlier, even though the projecting amount of the position restricting member 57 is smaller than that of the first shaft 55, the first shaft 55 is positively retired into the camera main body 52 from the mounting surface 53a.

In the state where the focus mode change-over button 65 is changed over to the manual focus mode side as shown in FIG. 13, since this change-over button 65 depresses the branched piece 63b of the lever 63 in the clockwise direction, the lever 64 depressed by the other branched piece 63a rotates in the counterclockwise direction. Therefore, the first shaft 55 fully retracts into the camera main body 52 from the mounting face 53a so as to be completely cut off from the second shaft 54 of the exchangeable lens barrel 51, whereby the operation of the unlock member 58 contributes only to engagement or disengagement of the position restricting member 57 with respect to the position restricting recess 56 at the side of the exchangeable lens barrel.

It should be noted that, in each of the foregoing embodiments, although the retreating timing from the mounting surface of the exchangeable lens barrel between the position restricting member and the first shaft and second shaft as the driving shaft and driven shaft during the unlocking operation, is so set that the first shaft retreats from the transmitting hole so as to be slightly retreated from the mounting surface, when the forward end of the position restricting member has retracted to the position where it has disengaged from the position restricting recess (i.e. the position where it is flush with each mounting surface), the arrangement is not limited to the above. But, it may be so modified that the position restricting member and the first shaft are simultaneously retracted up to the position where they become flush with the mounting surface. In such arrangement, during detachment through rotation of the exchangeable lens barrel from the camera main body, the forward end of the driving transmission shaft only lightly contacts the mating mounting surface even in the worst case, and thus, the smooth detachment through rotation can be achieved in the similar manner.

It should further be noted that, in the foregoing embodiments, the description is given with reference to the arrangement in which the mating instrument surface which the forward end of the position restricting member confronts, and the mating instrument surface where the forward ends of the first and second shafts confront, are adapted to be the same mounting surface. However, the arrangement is not limited to that in these embodiments. For example, even where the mating instrument surface which the forward end of the first shaft confronts is a mounting surface, while the mating instrument surface which the forward end of the position restricting member faces is a surface neighboring said mounting surface, with a step difference in height to a certain extent thereto, if the projecting amounts of the first shaft and the position restricting member are set by taking into account the amount of this step difference, the forward end of the first shaft can be adapted to retract to a position beyond the position where it becomes flush with the confronting surface of the mating instrument.

The means for setting the retreating timing of the position restricting member and the first shaft is not limited to the releasing member as in the foregoing embodiments, but an arrangement for setting such timing by an electrical control may also be employed apart from the above.

Other points which should be noted are that the optical unit to which the present invention is applicable is not limited to the photographic camera equipped with the automatic focusing unit as in the embodiments described above, but the invention may also be effectively applied to photographic cameras provided, for example, with a zooming mechanism or focusing mechanism by a motor drive. And, the mating instrument of the camera main body is not limited only to exchangeable lenses, but photographic accessories such as an extension ring, rear conversion lens of the like may be included. Furthermore, the present invention is applicable not only to the single lens reflex camera as described above, but also to range finder cameras of exchangeable lens type, video cameras, etc. and moreover, to projectors, enlargers, and the like depending on necessity.

Effects

According to the optical unit provided with the transmission shaft system of the present invention, since the position restricting member and the transmission shaft are associated with each other in their retreating function by the releasing means, remarkable effects noted as follows can be obtained.

(a) In the state where the position restricting member is released from the engagement by the unlocking operation, since the transmission shaft retracts to a position beyond the position where it is disengaged from the transmission shaft recess of the mating instrument, even when the rotational detaching operation of the mating instrument is effected, there is no possibility that the transmission shaft is caught by the mating instrument or the mating instrument becomes impossible to be detached, and thus, a smooth detachment may be effected. Moreover, there is no danger that the surface of the mating instrument is damaged during the rotational operation for the detachment.

(b) During the rotational detachment, the rotational force is not transmitted to the transmission shaft, and therefore, the clutch piece at the forward end of the transmission shaft is completely free from any damages.

(c) Even in the case where an operator starts the rotational detachment after the unlocking, and stops the unlocking operation by the unlock member in the course of the rotational detachment, since the first shaft advances, at most, only to substantially the same position as that of the position restricting member restricted for advance by the mating instrument, there is no possibility that the first shaft will be strongly pressed against the surface of the mating instrument. Thus, even if the rotational detachment is effected in such a state, the first shaft and the surface of the mating instrument are free from any damage. This advantage similarly applies to the case where the mating instrument is to be attached.

What is claimed is:

1. In an optical unit, comprising:
a main body including dirving means;
an exchangeable optical instrument including an optical system and driven means coupled with said optical system for shifting the same for focusing;
a first mounting portion disposed on said main body and provided with a first mount surface;
a second mounting portion disposed on said optical instrument and provided with a second mount surface, said optical instrument being mountable and dismountable on and from said main body through rotation thereof relative to said main body with said first and second mount surfaces being in a sliding contact;
a first shaft provided on said main body;
a second shaft provided on said optical instrument, said first shaft being coupled with said driving means for rotation driven by said driving means while said second shaft being coupled with said driven means for driving the same upon rotation thereof, said first shaft being supported for movement in the direction parallel to the optical axis of said main body between a projecting position projecting from said first mount surface to engage said second shaft and a retracting position retracting from said first mount surface to disengage from said second shaft;
a position restricting recess provided on said second mount surface;
a position restricting member provided on said main body to be movable in the direction parallel to the optical axis of said main body between a projecting position engaging said position restricting recess to restrict the rotational position of said optical instrument relative to said main body and a retracting position retracting from said recess to release the rotational position restriction of said optical instrument;
a means for interconnecting said manually operable member with manually operable member provided on said main body; and said first shaft and said position restricting member so as to move said first shaft and said position restricting member from their projecting position to their retracting position, respectively, upon a manual operation of said manually operable member,
the improvement wherein said interconnecting means includes movement enlarging means provided on said main body for enlarging the movement of said first shaft from its projecting position to its retracting position relative to that of said position restricting member from its projecting position to its retracting position so that said first shaft retracts from said first mount surface before said position restricting member retracts from said first mount surface.

2. An optical unit as set forth in claim 1, further comprising an urging means urging said interconnecting means for moving said first shaft and said position restricting member from their retracting position to their projecting position.

3. An optical unit as set forth in claim 1, wherein said movement enlarging means includes a lever rotatably supported around its rotation axis and interlocked with said first shaft and said position restricting member at first and second interlocking portions respectively, the distance from said rotation axis to said first interlocking portion being determined to be longer than the distance from said rotation axis to said second interlocking portion.

4. An optical unit as set forth in claim 3, further comprising a first urging means urging said first shaft from its retracting position to its projecting position and a second urging means urging said position restricting member from its retracting position to its projecting position.

5. An optical unit as set forth in claim 4, further comprising a changeover member shifting said lever for moving said first shaft to its retracting position against the urging force of said first urging means.

6. In an optical unit, comprising:
a main body including driving means;
an exchangeable optical instrument including an optical system and driven means coupled with said optical system for shifting the same for focusing;
a first mounting portion disposed on said main body and provided with a first mount surface;
a second mounting portion disimposed on said optical instrument and provided with a second mount surface, said optical instrument being mountable and dismountable on and from said main body through rotation thereof relative to said main body with said first and second mount surface being in a sliding contact;
a first shaft provided on said main body, being coupled with said driving means for rotation driven by said driving means;
a second shaft provided on said optical instrument, being coupled with said driven means for driving the same upon rotation thereof, and being supported for movement in the direction parallel to the optical axis of said optical instrument between a projecting position projecting from said second mount surface to engage said first shaft and a retracting position retracting from said second mount surface to disengage from said second shaft;
a position restricting recess provided on said first mount surface;
a position restricting member provided on said optical instrument to be movable in the direction parallel to the optical axis of said optical instrument between a projecting position engaging said position restricting recess to restrict the rotational position of said optical instrument relative to said main body and a retracting position retracting from said recess to release the rotational position restriction of said optical instrument;

a manually operable member provided on said optical instrument; and means for interconnecting said manually operable member with said second shaft and said position restricting member so as to move said second shaft and said position restricting member from their projecting position to their retracting position, respectively, upon a manual operation of said manually operable member;

the improvement wherein said interconnecting means includes movement enlarging means providing on said optical instrument for enlarging the movement of said second shaft from its projecting position to its retracting position relative to that of said position retracting member from its projecting position to its retracting position, so that said second shaft retracts from said second mount surface before said position restricting member retracts from said second mount surface.

* * * * *